United States Patent
Seitz et al.

(10) Patent No.: US 6,458,315 B1
(45) Date of Patent: Oct. 1, 2002

(54) PROCESS FOR PRODUCING A SI/C/N CERAMIC BODY

(75) Inventors: Juliane Seitz; Bill Joachim, both of Stuttgart; Fritz Aldinger, Oberaichen, all of (DE); Yngve Naerheim, Thousand Oaks, CA (US)

(73) Assignee: Max-Planck-Gesellschaft zur Forderung der Wissenschaften E.V., Munich (DE)

( * ) Notice: Subject to any disclaimer, the term of this patent is extended or adjusted under 35 U.S.C. 154(b) by 0 days.

(21) Appl. No.: 09/600,882
(22) PCT Filed: Feb. 12, 1998
(86) PCT No.: PCT/EP99/00921
§ 371 (c)(1),
(2), (4) Date: Nov. 29, 2000
(87) PCT Pub. No.: WO99/41211
PCT Pub. Date: Aug. 19, 1999

(30) Foreign Application Priority Data

Feb. 13, 1998 (DE) .......................................... 198 06 044

(51) Int. Cl.[7] .............................................. B28B 3/00
(52) U.S. Cl. ........................ 264/625; 264/624; 264/626; 264/653
(58) Field of Search ................................. 264/624, 625, 264/626, 653

(56) References Cited

U.S. PATENT DOCUMENTS 4,929,575 A * 5/1990 Khoury et al. ............... 501/137
5,294,574 A * 3/1994 Riedel et al. .................. 501/88

OTHER PUBLICATIONS

J.Seitz et al., "Production of compact polysilazane–derived Si/C/N–ceramics by plastic forming", Journal of Materials Science Letters, vol. 15, 1996, pp. 391–393.

* cited by examiner

Primary Examiner—Christopher A. Fiorilla
(74) Attorney, Agent, or Firm—Arent Fox Kintner Plotkin & Khan, PLLC

(57) ABSTRACT

A process for producing crack-free shaped ceramic bodies based on Si/C/N by hot pressing of crosslinked polysilazane powder and subsequent pyrolysis of the hot-pressed shaped body employs a pressing temperature higher than the temperature maximum of the TMA curve of the optimally crosslinked polymer.

8 Claims, 1 Drawing Sheet

PROCESS FOR PRODUCING A SI/C/N CERAMIC BODY

Figure 1A:
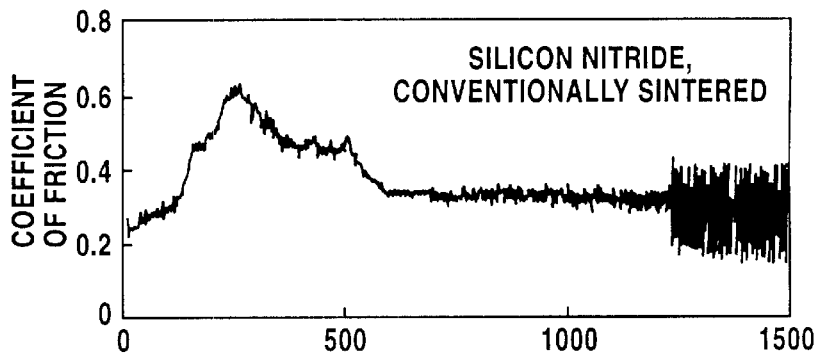

This application is a 371 of PCT/EP 98/00921 filed Feb. 12, 1998

Description

The invention relates to a process for producing crack-free shaped ceramic bodies based on Si/C/N by hot pressing of crosslinked polysilazane powder and subsequent pyrolysis of the hot-pressed shaped body, and also to the use of a shaped body produced in this way for tribological purposes.

In the case of materials for tribological applications, for example brake linings, it is not only the friction properties but also, in particular, the wear behavior of the material which is of interest. Here, both the wear of the part itself and also the wear caused on the other part against which rubbing occurs have to be taken into account. Both should be as small as possible. However, in the case of wear parts such as brake linings, minimum wear on the part against which rubbing takes place, for example a brake disk, is of even greater importance.

Ceramics produced by the polymer pyrolysis process have great advantages in this respect. Such ceramic materials based on Si/C/N can be produced by pyrolysis of organic polymers without addition of additives (R. Rice, Ceram. Bull. 62 (1983), 889; D. Seyferth et al., J. Am. Ceram. Soc. 67 (1984), 132). In this production method, the polymer firstly has to be optimally crosslinked by thermal means in order to be able to be converted into dense shaped parts by subsequent plastic deformation. The pressing temperature must not exceed the temperature maximum in the TMA curve (TMA=thermomechanical analysis), since otherwise cracks can arise in the pyrolyzed ceramic body formed (J. Seitz et al., J. Mater. Sci. Letters 15 (1996), 391–393; conference proceedings "Reibung und Verschleiβ", DGM, Bad Nauheim (1996), 335–340). In order to achieve optimum crosslinking, the crosslinking procedure has to be matched individually to each polymer batch, which is laborious.

It is therefore an object of the invention to provide a process for producing crack-free shaped ceramic bodies based on Si/C/N which does not have the disadvantages of the prior art.

This object is achieved according to the invention by a process for producing crack-free shaped ceramic bodies based on Si/C/N by hot pressing of crosslinked polysilazane powder and subsequent pyrolysis of the hot-pressed shaped body, wherein the pressing temperature employed is higher than the temperature maximum of the TMA curve of the optimally crosslinked polymer.

It has surprisingly been found that the process of the invention makes it possible to obtain ceramic materials which have excellent properties, for example a low coefficient of friction, homogeneous frictional behavior and, in particular, low wear values, specifically in respect of the wear of the part against which rubbing takes place. Furthermore, the polymer pyrolysis ceramic materials produced using the process of the invention display excellent thermal stability and oxidation resistance.

According to the invention, crosslinked polysilazane powders are used as starting materials for producing crack-free shaped ceramic bodies based on Si/C/N. The polysilazane powder is selected according to the respective requirements of the intended application. Suitable polysilazanes include, for example, polyhydridomethylsilazanes, polyvinylsilazanes and others. However, it is also possible to use modified polysilazanes which contain further elements, in particular titanium and/or boron, in addition to Si/C/N. Such modified polysilazanes can be prepared, for example, by reaction of polysilazanes with element alkylamides (thesis, M. Frieβ, Stuttgart, 1994) or by hydroboration of vinylsilazanes. The polysilazane powder used is particularly preferably a polyhydridomethylsilazane marketed under the name NCP 200 by Nichlmen Corp. or a polyvinylsilazane marketed under the name VT 50 by Hoechst AG.

According to the invention, the polysilazane powder is firstly crosslinked. Here, it is not necessary to optimize the crosslinking individually for each polymer batch. For the purposes of the process of the invention, it is sufficient to carry out the crosslinking using a standard crosslinking program regardless of the polymer powder used. For the purposes of the present invention, an optimally crosslinked polymer is a material whose degree of crosslinking makes it possible to produce crack-free, abrasion-resistant shaped parts by cold isostatic pressing and subsequent pyrolysis. Thus, an "optimally crosslinked polymer" is suitable for cold isostatic pressing.

The crosslinked polysilazane powder is pulverized if necessary and hot pressed. Subsequent pyrolysis gives dense shaped parts. These shaped parts typically have a density of greater than 90% of the theoretical density, preferably greater than 93% of the theoretical density and particularly preferably greater than 95% of the theoretical density. It has surprisingly been found that hot pressing at elevated temperature makes it possible to obtain crack-free shaped ceramic bodies without optimized thermal crosslinking having to be carried out beforehand. According to the invention, the pressing temperature during shaping is selected so that it is higher than the temperature maximum of the TMA curve of the optimally crosslinked polymer.

In TMA (thermomechanical analysis), a specimen is heated in an inert atmosphere at a predetermined heating rate while the linear shrinkage or expansion is measured. The heating rate is typically 5 K/min. For evaluation of the test, the relative shrinkage in % is plotted against the temperature. The temperature value at which the recorded curve has its maximum is referred to as the temperature maximum. The TMA curve usually rises initially with steadily increasing temperature to a temperature maximum and then falls as the temperature is increased further.

According to the invention, hot pressing is carried out at a temperature which is higher than the temperature maximum of the TMA curve of the optimally crosslinked polymer. The temperature employed is preferably from 50 to 1000° C. higher than the temperature maximum of the TMA curve. Hot pressing is preferably carried out at a pressure of from 10 MPa to 70 MPa, particularly preferably from 20 MPa to 60 MPa and most preferably from 30 MPa to 50 MPa. Hot pressing can be carried out at a pressing temperature up to the pyrolysis temperature of the respective materials (e.g. 1050° C. for NCP 200). The pressing temperature employed for hot pressing is preferably from 275 to 600° C., particularly preferably from 300 to 500° C. and most preferably from 330 to 450° C. Polyhydridomethylsilazane is, after thermal crosslinking and pulverization, preferably pressed to form shaped bodies at a temperature of from 350 to 420° C.

Pyrolysis of the hot-pressed shaped bodies, which are also referred to as green bodies, gives ceramics having a high density. The density of the ceramics is generally >92% of the theoretical density, preferably >95% of the theoretical density and particularly preferably >97% of the theoretical density. Depending on the conditions employed for the thermal treatment, amorphous or crystalline structures are obtained. Amorphous structures are obtained particularly when the pyrolysis is carried out in a temperature range from about 800 to 1200° C., preferably from 1000 to 1200C. When the thermal treatment is carried out at higher temperatures, for instance from 1200 to 2000° C., preferably from 1500° C. to 2000° C., at least partially crystalline structures are obtained. The hot pressing and/or the pyrolysis are preferably carried out in an inert atmosphere, for example under argon or nitrogen.

Studies on crack-free shaped ceramic bodies produced according to the invention showed that the materials tested, in particular amorphous ceramics produced from NCP 200 or VT 50, are superior to the previously known tribological materials and result in minimal wear on the part against which rubbing takes place.

The pyrolysis of the pressed body is preferably carried out at a temperature of from 1000 to 1200° C. under protective gas, for example under argon or nitrogen. In the case of phase separation in the temperature range from 1000 to 2000° C., precipitation of lubricating substances such as graphite or, if the shaped body contains a further element, e.g. titanium or boron, in addition to the elements Si/C/N, hexagonal boron nitride or titanium carbonitride can occur, depending on the composition of the respective material. These precipitates serve to distribute these materials, which are of interest primarily in respect of solid-state lubrication of the ceramic materials, uniformly in the ceramic material. In the case of titanium-containing materials, the formation of nonstoichiometric titanium oxides, so-called "lubricious oxides", which have lubricant properties from titanium carbonitride is possible when the part is used in a wear situation. Titanium-containing polysilazanes can be prepared, for example, by reacting polysiloxanes with titanium alkylamides, for example the tetrakis(dialkylamino) titanium compounds $Ti[N(CH_3)_2]_4$ or $Ti[N(CH_2CH_3)_2]_4$, with the crosslinking of the polysilazane being carried out, in particular, by reaction with such a tetrakis(dialkylamino) titanium compound. It is also possible to use a crosslinked polysilazane powder which is obtained by hydroboration of vinylsilazane to form a boron-containing polysilazane.

The invention further provides for the use of a shaped body produced by the process of the invention for tribological purposes. The shaped bodies produced according to the invention display excellent frictional properties such as low coefficients of friction (<0.2, preferably <0.1), homogeneous frictional behavior and particularly low wear values and also a high thermal stability and oxidation resistance. The shaped bodies produced according to the invention have, in particular, a coefficient of friction which lies within a predetermined range (preferably ±20%, particularly preferably ±10% and most preferably ±5%) and displays only slight fluctuations, so that uniform braking action is ensured. The material properties can be matched very well to the respective requirements of the tribological application by variation of the crosslinked polymer material used. In particular, the shaped bodies produced according to the invention are suitable for producing brake materials, e.g. brake linings, which cause extremely low wear on the brake disk.

The invention is illustrated by the following examples.

EXAMPLE 1
Production of a Polymer Pyrolysis Ceramic Based on Si/Ti/C/N

The ceramic is produced from a commercially available polyhydridomethylsilazane having the trade name NCP 200® from Nichlmen Corp. and tetrakis(diethylamino) titanium. In a 500 ml Schlenk flask fitted with low-temperature condenser, gas outflow tube and attached wash bottles, 103.26 g (0.0861 mol) of NCP 200 (M=1200 g/mol) were dissolved with stirring in 300 ml of dry toluene and, while continuing to stir, 30 ml (0.0829 mol) of tetrakis (diethylamino)titanium ($Ti[N(CH_2CH_3)_2]_4$) were added dropwise, resulting in the reaction solution darkening. The mixture was then refluxed until slight gas evolution was observed. The toluene was then distilled off via an ether bridge and the yellow residue was carefully dried under reduced pressure at room temperature. The yield was 84.50 g (64.5%).

The polymer obtained in this way was thermally crosslinked beyond the range optimum for cold isostatic pressing. For this purpose, 100 g of polymer were heated to 350° C. (heating rate =780 K/h) in a stream of argon in a cylindrical glass vessel (Ø=10 cm). The temperature was then held for 185 minutes (125 minutes in the stream of argon and 60 minutes under a reduced pressure of $1.0\times10^{-2}$ mbar). The vessel was then cooled and flooded with argon. The crosslinked product was milled and sieved through a sieve having a mesh opening of 140 μm.

The sieved powder was uniaxially pressed in a cylindrical graphite die in a hot press at elevated temperature. The maximum pressing pressure was 47.45 MPa and the maximum pressing temperature was 400° C. This temperature is about 100° C. above the temperature maximum of the TMA curve of the optimally crosslinked Si/Ti/C/N polymer. During pressing, the pressure and the temperature were simultaneously increased continuously, with the pressure being increased from a preliminary pressure of 7.9 MPa to 47.75 MPa in 20 minutes while simultaneously increasing the temperature to 400° C. The entire hot pressing procedure was carried out under argon gas. The green bodies obtained in this way were pyrolyzed at 1050° C. to give an amorphous ceramic. The pyrolysis took place at a heating rate of 25 K/h and a hold time at 1050° C. of 4 hours under argon gas. The ceramic material obtained has a density of 96% of the theoretical density.

EXAMPLE 2
Thermomechanical Analysis (TMA)

The thermomechanical analysis was carried out on a TMA 2000 instrument (manufacturer: Bähr). TMA simulates pyrolysis. It is used primarily for monitoring the state of crosslinking of a polymer.

A green body (crosslinked, pressed polymer powder) is pyrolyzed using any heating program and the length changes are measured as a function of the temperature. During the entire heating and cooling 5 cycle, a pulsating pin acts on the specimen (base load: 1 N; pulsating additional load: 1 N; frequency: 0.1 Hz). In this way, the softening range of the polymer can be additionally determined by means of vibrations in the measured curve caused by the pulsating load.

The following heating program is usually employed: heating rate: 300 K/h; target temperature: 1100° C.; hold time: 1 h; maximum cooling rate (about 800 K/h). The measurements are carried out in a gentle stream of argon (about 2 1/h).

To produce a TMA specimen, the crosslinked polymer powder is cold isostatically pressed to form a cylindrical green body (Ø6mm; h:8mm).

EXAMPLE 3

Tribological Studies a) Materials

Si/C/N materials are of particular interest with a view to potential solid-state lubrication due to the free carbon present. In the crystallization of such materials, it is possible, regardless of the respective composition of the ceramic, for completely homogeneously distributed carbon precipitates to be formed. To examine the lubricant action of carbon, two Si/C/N materials produced by plastic deformation having different carbon contents were tested. The first material was a ceramic having a low carbon content (14.2% by mass in the amorphous ceramic) produced from the polymer NCP 200, and the other was a ceramic having a higher carbon content (28.5% by mass in the amorphous ceramic) produced from the polymer VT 50. Both amorphous (pyrolyzed at 1050° C.) and crystalline (heat treated at 1500° C.) specimens of the two materials were examined.

In Si/Ti/C/N materials, it is possible for nonstoichiometric titanium dioxides $TiO_{2-x}$ (0<x<0.25), so-called "lubricious oxides", which, owing to their sheet structure, can perform a lubricating function analogous to graphite to be formed. Such "lubricious oxides" can be formed on the surface of an amorphous or crystalline Ti-containing Si/Ti/C/N material by reaction of titanium carbonitride with oxygen at elevated temperature, with the reaction of titanium carbonitride with atmospheric oxygen also being able to take place during use in tribological application. The Si/Ti/C/N materials used were amorphous and crystalline ceramics produced from Ti-containing NCP 200 polymer by hot pressing using a method analogous to Example 1 (Ti content:4.5% by mass in the amorphous material and 6.0% by mass in the crystalline material). The crystallization was carried out at 1500° C. TEM examination indicated that all elements are distributed homogeneously in the amorphous material, and that the crystalline material comprises nanocrystalline titanium carbonitride precipitates having a size of 300 nm.

In Si/B/C/N materials, it is possible for boron nitride, which can likewise have lubricating properties due to its graphite-like sheet structure, to be formed. As Si/B/C/N material, use was made of ceramics produced from B-containing NCP polymer. The boron content of the material used was 1.1% by mass (amorphous material) or 0.3% by mass (crystalline material). Since the crystallization of boron-containing Si/B/C/N materials commences only at relatively high temperatures, the crystalline specimens were heat-treated at 1800° C.

b) Test Results

The studies were carried out in a specially constructed tribometer in the Rockwell International Science Center (USA) using the test parameters F=45 N and v=5.5 m/s in air. As contact bodies, use was made of metal plates made of cast iron. The materials produced according to the invention were compared with conventionally sintered silicon carbide and silicon nitride. After the tests had been carried out, the specimen surfaces which had been subjected to friction and the surfaces of the metal contact bodies were examined by means of ESCA (electron spectroscopy for chemical analysis) and by Auger spectroscopy.

c) Coefficients of Friction

Figure 1B:
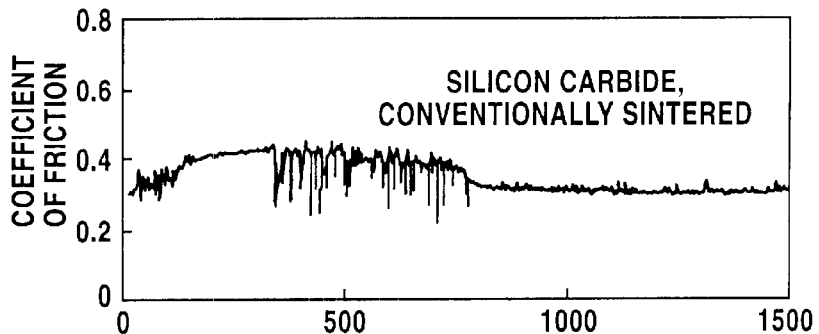
Figure 1C:
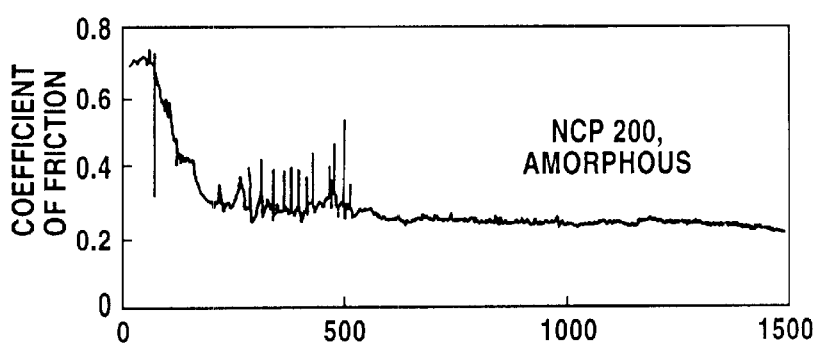
Figure 1D:
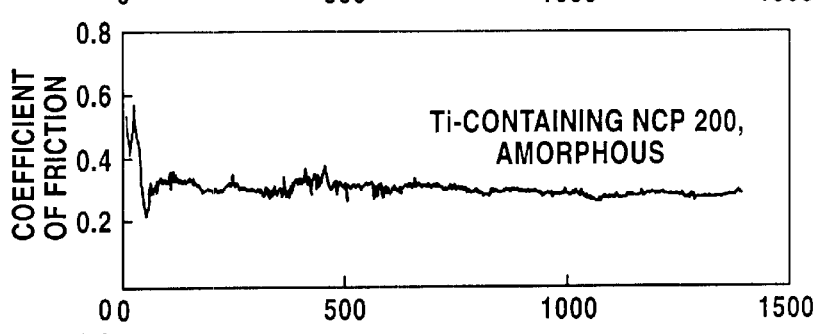
Figure 1E:
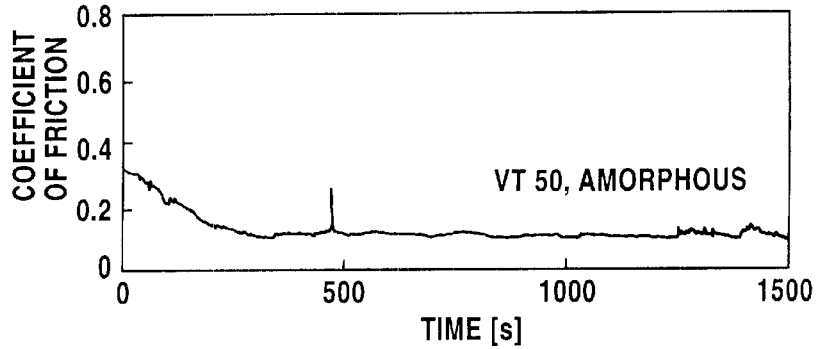

FIG. 1 shows the coefficients of friction of the amorphous materials as a function of time in comparison to SiC and $Si_3N_4$; FIG. 1A shows the coefficient of friction of conventionally sintered silicon nitride versus time, FIG. 1B shows the coefficient of friction of conventionally sintered silicon carbide versus time, FIG. 1C shows the coefficient of friction of an amorphous ceramic body produced according to the invention from NCP 200 versus time, FIG. 1D shows the coefficient of friction of an amorphous ceramic body produced according to the invention from NCP 200 with addition of titanium versus time and FIG. 1E shows the coefficient of friction of an amorphous ceramic material produced according to the invention from VT 50 versus time.

In the case of the SiC produced by a powder-technological route, large fluctuations in the coefficient of friction occur in the first 800 seconds. In the case of conventionally produced $Si_3N_4$, too, such fluctuations occur, particularly after 1200 seconds. The polymer pyrolysis materials produced according to the invention display significantly more constant curves. In the case of the amorphous Si/C/N ceramic produced from NCP 200, some fluctuations occur only at the beginning and the coefficient of friction curve is essentially constant after about 500 seconds. In the case of the amorphous Si/Ti/C/N ceramic, virtually no fluctuations are observed, which is attributed to the influence of the titanium. The amorphous Si/C/N ceramic produced from VT 50 likewise displays a very stable curve with a particularly low coefficient of friction of about 0.1. This is attributed to the high carbon content of VT 50 (35.9 atom% at the surface), which is partly present in graphite-like form at the wear surface, as has been demonstrated by ESCA. The crystalline precipitated carbon has a very good lubricating action even at elevated temperature (to 400° C.).

d) Generation of Heat

The frictional behavior of materials is also reflected in the temperatures reached during tribological tests. In general, high temperatures are undesirable since they lead to greater stress on the material and greater susceptibility to oxidation. Table 2 shows the maximum temperatures reached during the tribological tests.

TABLE 2

| $Si_3N_4$ | SiC | Si/C/N (NCP 200) amorphous | Si/Ti/C/N, amorphous | Si/C/N (VT 50) amorphous |
|---|---|---|---|---|
| >1100° C. | >1100° C. | 900° C. | 950° C. | <400° C. | e) Wear values

In the case of the wear values, a distinction is made between the linear wear on the metal contact body and wear on the ceramic. Table 3 shows the values obtained.

TABLE 3

| Material | Linear wear on the contact body [μm] | Linear wear on the ceramic [μm] |
|---|---|---|
| SiC | 59.7 | 127.0 |
| $Si_3N_4$ | 50.8 | 53.3 |
| Si/C/N (NCP 200), amorphous | 7.6 | 73.7 |
| Si/Ti/C/N, amorphous | 2.5 | 85.1 |
| Si/C/N (VT 50), amorphous | 0 | 175.3 |

Compared to conventionally produced materials, the amorphous polymer pyrolysis ceramics display particularly. low wear values on the metal contact body. The amorphous Si/C/N ceramic produced from VT 50 causes virtually no wear at all on the metal, which is extremely advantageous for many applications, e.g. brake linings.

What is claimed is:

1. A process for producing a crack-free shaped ceramic body based on Si/C/N by:

hot pressing crosslinked polysilazane powder to form a hot-pressed shaped body at a temperature of 275–600° C.; and subsequently pyrolyzing the hot-pressed shaped body to convert the body to a ceramic body.

2. The process as claimed in claim 1, wherein the pressing temperature employed is in the range from 300 to 500° C.

3. The process as claimed in claim 2, wherein polyhydridomethylsilazane is thermally crosslinked and pulverized and then pressed at a temperature in the range from 350 to 420° C. to form the shaped body.

4. The process as claimed in claim 1, wherein the pyrolysis of the pressed body is carried out at a temperature in the range from 1000 to 1200° C. under protective gas.

5. The process as claimed in claim 1, wherein the crosslinking of the polysilazane is carried out by reaction with a tetrakis(dialkylamino) titanium compound.

6. The process as claimed in claim 1, wherein the crosslinked polysilazane powder used is obtained by hydroboration of vinylsilazane to form a boron-containing polysilazane.

7. A method of forming a tribological material comprising utilizing a shaped body produced by the process claimed in claim 1.

8. A method for producing brake materials comprising utilizing the tribological material produced by the method claimed in claim 7.

* * * * *